LE ROY A. FRANKE.
LAWN MOWER.
APPLICATION FILED MAR. 10, 1911.

1,047,194.

Patented Dec. 17, 1912.
2 SHEETS—SHEET 1.

WITNESSES
G. M. Spring.
L. M. Hastings.

INVENTOR
Le Roy A. Franke,
by Richard B. Owen,
his Attorney

LE ROY A. FRANKE.
LAWN MOWER.
APPLICATION FILED MAR. 10, 1911.

1,047,194.

Patented Dec. 17, 1912.
2 SHEETS—SHEET 2.

WITNESSES
G. M. Spring
L. M. Hastings

INVENTOR
Le Roy A. Franke,
by Richard ＿＿＿
his Attorney

UNITED STATES PATENT OFFICE.

LE ROY A. FRANKE, OF FOSTORIA, OHIO.

LAWN-MOWER.

1,047,194.  Specification of Letters Patent.  Patented Dec. 17, 1912.

Application filed March 10, 1911. Serial No. 613,643.

*To all whom it may concern:*

Be it known that I, LE ROY A. FRANKE, a citizen of the United States, residing at Fostoria, in the county of Seneca and State of Ohio, have invented new and useful Improvements in Lawn-Mowers, of which the following is a specification.

My invention relates to lawn mowers, and more particularly to an attachment for lawn mowers adapted to engage comparatively tall blades of grass, weeds and the like, and pull them down into the path of the cutter or blades in order to prevent the mower from running over the same without cutting them.

With the present type of lawn mower it is practically impossible to cut grass when it is tall (comparatively speaking) or when it is interspersed with weeds such for instance as dandelions, for in such cases the mower either runs over them without cutting off the heads or else they become entangled in the whirling blades of the mower thus necessitating the cessation of operations until they can be disengaged.

It is an object of my invention to overcome this difficulty by providing mowers with an auxiliary whirling attachment, which shall be disposed above and in front of the cutting blade or knives so as to bring the heads of weeds and tall grass directly into the path of the knives, so as to cause them to be sheared off.

With the foregoing and other objects in view my invention consists in such details of construction and in the arrangement and combination of parts as will be hereinafter more fully described and specifically pointed out in the appended claims.

In describing my invention in detail reference will be had to the accompanying drawings wherein like characters denote like or corresponding parts throughout the several views, and in which:—

Figure 1:
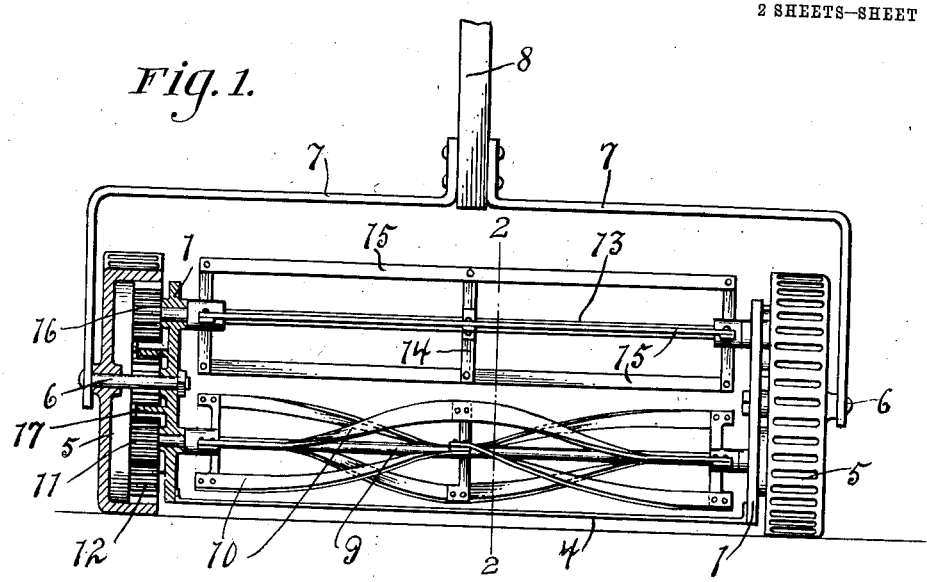
Figure 2:
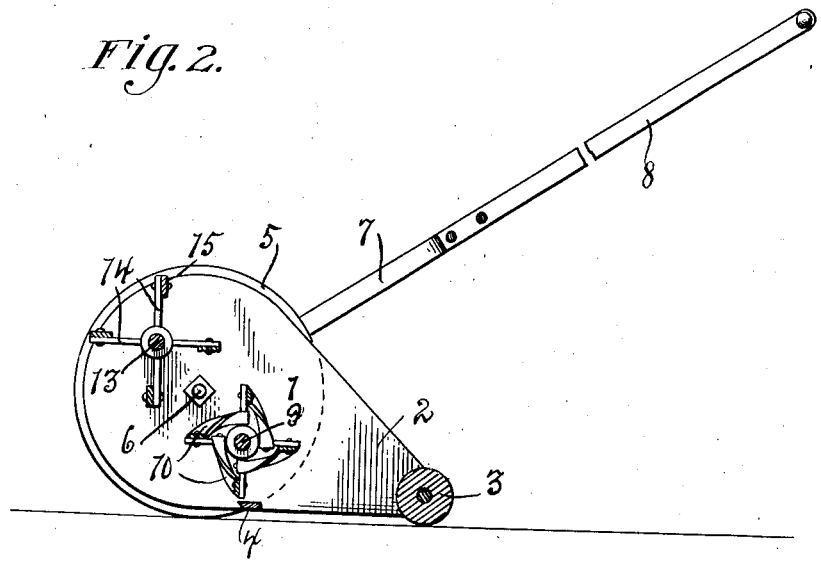
Figure 3:
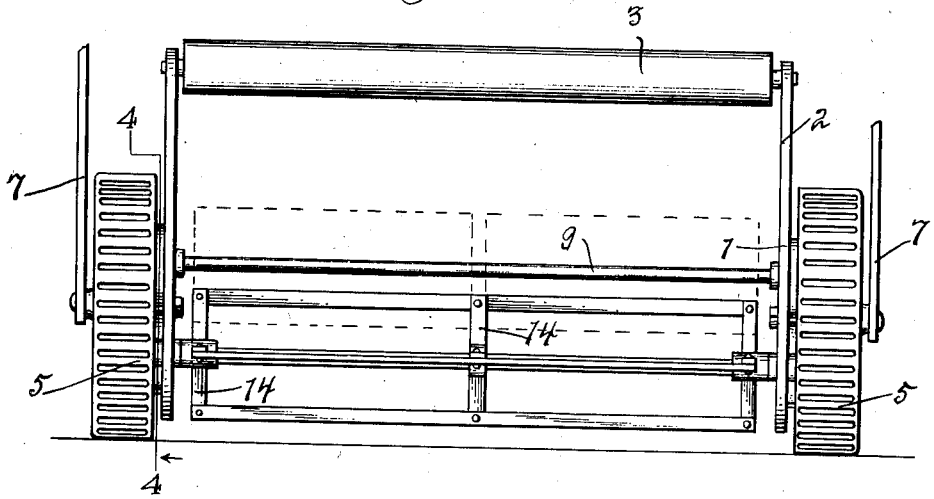
Figure 4:
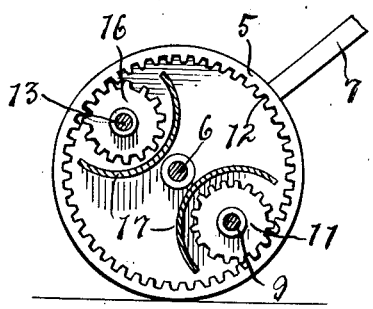
Figure 5:
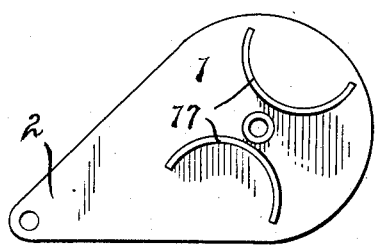

Figure 1 is a view in front elevation of the operative part of my improved mower showing one side in section so as to disclose the operating mechanism. Fig. 2 is a vertical sectional view taken on the line 2—2 of Fig. 1. Fig. 3 is a top plan view of my mower, the knives being omitted but their positions indicated in dotted lines. Fig. 4 is a vertical sectional view taken on the line 4—4 of Fig. 3, and Fig. 5 is a detailed view in elevation of one side of the frame work of my mower.

In reducing my invention to practice I construct a frame work composed of two side plates 1, which are comparatively large at their forward ends but which taper considerably toward their rear ends 2 in which rear ends the supporting roller 3 is journaled. The side plates 1 are connected at their lower ends by the stationary knife bar 4. Drive wheels 5 are pivotally connected to the side plates 1 by means of bolts 6 as is clearly shown in Fig. 1. To the outer ends of said bolts are connected angular braces 7 to which is attached the usual handle 8 in any desired manner. Above the knife bar 4 and somewhat to the rear of a line connecting the centers of the drive wheels, is a shaft 9 carrying cutting blades 10 of usual construction. Mounted upon the ends of the shaft 9 and extending into the drive wheels is a tooth pinion 11 which is in engagement with the teeth 12, formed on the internal periphery of the flange of the drive wheel. It will be seen that the cutting blades 10 are caused to rotate through this connection when the drive wheels are revolved.

The foregoing construction is merely arbitrary and may be changed at will it being set forth merely for the purpose of illustrating one form of mower to which my improved attachment may be connected. This attachment comprises a shaft 13, the opposite ends of which are journaled in the side plates 1 as set forth above in connection with the shaft 9. The shaft 13 however is disposed in front of a line connecting the centers of the drive wheel and above the same as is clearly shown in Figs. 2 and 4. Radiating from hubs mounted upon the shaft 13 are a number of arms or spokes 14 which carry bars 15 at their outer ends, said bars connecting the various spokes. Mounted upon an end of the shaft 13 is a pinion 16, which is also adapted to be engaged by the teeth 12 of the drive wheel said pinion 16 being disposed diametrically opposite the pinion 11 with respect to the drive wheel 5 which construction will be clearly understood upon reference to Fig. 4.

It will be seen that when the mower is driven the bars 15 rotate in the same direction as do the blades 10 and will rake in and push downward the tops of any weeds or long grass that may come in their path so that said weeds or grass will be properly engaged by the whirling cutter blades which will shear off the same in like manner as if they were short.

In order to prevent foreign substances from lodging in the teeth of the pinions I provide the end plates 1 with semicircular guard flanges 17, which somewhat inclose said pinions in a manner which will be understood upon reference to Figs. 1, 4 and 5.

The operation and purpose of my invention will be fully understood from the foregoing. It will be seen that I have provided a mower adapted to cut long as well as short grass and which will also cause weeds to be sheared off equally as easily as grass. It will also be noted that the attachment costs comparatively little and that my improved mower is not expensive to manufacture.

I desire it to be understood that slight changes in the construction and in the arrangement and combination of parts may be resorted to without departing from the spirit of my invention, provided such changes fall within the scope of the appended claims.

Having thus fully described my invention, what I claim as new and desire to secure by Letters Patent, is:—

1. A lawn mower comprising side plates, drive wheels mounted thereon, shafts journaled in said side plates, one shaft carrying knives, paddle bars connected to the other shaft, pinions on the ends of said shafts within said drive wheels and having connection therewith, and semi-circular guards on said side plate incasing said pinions.

2. A lawn mower comprising side plates, drive wheels mounted upon said plates, a pair of shafts connecting said plates, one of said shafts being disposed in front of and above the axes of the drive wheels, the other to the rear of and below the axes of the drive wheels, said shafts being diametrically opposite, radially extending cutting blades mounted on the lower shaft, radially extending arms mounted on the upper shaft, bars carried by said arms, gears mounted on one extremity of said shafts and extending beyond the outer face of one of said plates, gear teeth mounted on the inner periphery of one of said drive wheels, the said gears adapted to mesh with said gear teeth, and a handle extending from said plates, substantially as described.

3. A lawn mower comprising side plates, drive wheels mounted on said plates, one end of said plates being enlarged, the smaller ends of said plates being connected by a roller, a pair of shafts connecting said plates, one of said shafts being disposed in front of and above the axis of the drive wheels, the other shaft to the rear of and below the axis of the drive wheels, cutting blades mounted on one of said shafts, paddle bars mounted on the other of said shafts, a gear wheel mounted on the extremity of each shaft, an intermediate gear wheel with which said gears mesh mounted on and driven by one of the drive wheels, and a stationary cutting bar connecting said plates lying tangent to the lower extremity of the cutting blades.

4. A lawn mower comprising side plates, said side plates being enlarged at one end, the smaller ends of said plates being connected by a roller, drive wheels mounted upon the enlarged portions of said plates, a pair of shafts connecting said plates, one of said shafts being disposed in front of and above the axis of the drive wheels, the other in the rear of and below the axis of the drive wheels, paddle bars mounted on the first mentioned shaft, cutting blades mounted on the last mentioned shaft, said paddle bars arranged in advance of the said cutting blades, a stationary cutting bar connecting the lower edge of said plates and lying tangent with the said cutting blades, guards mounted on one of said plates, a gear wheel mounted on one end of each shaft and adapted to rest within said guards, and a gear wheel driven by one of the drive wheels meshing with said gear wheels.

LE ROY A. FRANKE.

Witnesses:
L. J. ESHELMAN,
NELSON HICKS.